(12) United States Patent
Ma et al.

(10) Patent No.: US 12,524,829 B2
(45) Date of Patent: Jan. 13, 2026

(54) GENERATING A COMPLETE BOREHOLE IMAGE USING TRANSFORMATION (71) Applicant: Halliburton Energy Services, Inc., Houston, TX (US)

(72) Inventors: Ho Yin Ma, Singapore (SG); Ning Tu, Singapore (SG); Xiang Wu, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 103 days.

(21) Appl. No.: 18/640,200

(22) Filed: Apr. 19, 2024

(65) Prior Publication Data
US 2025/0371650 A1 Dec. 4, 2025

Related U.S. Application Data (63) Continuation of application No. 17/390,068, filed on Jul. 30, 2021, now Pat. No. 11,995,791.

(51) Int. Cl.
G06T 3/10 (2024.01)
E21B 47/002 (2012.01)
G06T 3/04 (2024.01)
G06T 7/00 (2017.01)
G06T 11/00 (2006.01)
G06T 11/20 (2006.01)

(52) U.S. Cl.
CPC ............ *G06T 3/10* (2024.01); *E21B 47/0025* (2020.05); *G06T 3/04* (2024.01); *G06T 7/0004* (2013.01); *G06T 11/00* (2013.01); *G06T 11/206* (2013.01); *G06T 2207/20052* (2013.01); *G06T 2207/20056* (2013.01); *G06T 2207/30108* (2013.01); *G06T 2207/30184* (2013.01)

(58) Field of Classification Search
CPC ... G06T 3/0056; G06T 3/0012; G06T 7/0004; G06T 11/00; G06T 11/206; E21B 47/0025
See application file for complete search history.

(56) References Cited

U.S. PATENT DOCUMENTS

2009/0167556 A1* 7/2009 Signer .................... G01V 11/00
340/853.1
2010/0097068 A1* 4/2010 Itskovich ................. G01V 3/20
324/367

\* cited by examiner

*Primary Examiner* — Mishawn N. Hunter
(74) *Attorney, Agent, or Firm* — Kilpatrick Towsend & Stockton LLP (57) ABSTRACT A system can receive downhole acquisition data relating to a wellbore. The system can pre-process the downhole acquisition data. The system can generate an incomplete borehole image using the downhole acquisition data. The system can determine a sparse representation based on the incomplete borehole image by performing an optimization with respect to the incomplete borehole image. The system can generate a complete borehole image based on an inverse of the sparse representation.

20 Claims, 5 Drawing Sheets

GENERATING A COMPLETE BOREHOLE IMAGE USING TRANSFORMATION

CROSS-REFERENCE TO RELATED APPLICATIONS

This is a continuation of U.S. application Ser. No. 17/390,068 filed Jul. 30, 2021, entitled "GENERATING A COMPLETE BOREHOLE IMAGE USING TRANSFORMATION," the entirety of which is incorporated by reference herein.

TECHNICAL FIELD

The present disclosure relates generally to wellbore imaging and, more particularly (although not necessarily exclusively), to generating a complete borehole image using one or more transformations.

BACKGROUND

A wellbore can be formed in a subterranean formation for extracting produced hydrocarbon or other suitable material. A wellbore operation can be performed to extract the produced hydrocarbon. The wellbore operation can include or otherwise involve imaging the wellbore or generating images downhole in the wellbore or borehole. The generated images of the borehole may be incomplete since a borehole imaging tool may be limited by tool specification, size, or a combination thereof of the borehole. The incomplete image may not be sufficient for the formation interpretation and may lead to inefficient or otherwise unsuccessful wellbore operation.

DETAILED DESCRIPTION

Certain aspects and examples of the present disclosure relate to generating a complete image, from an incomplete image, with respect to downhole acquisition data based on a sparse representation of the downhole data. The complete image (i.e., 100% azimuthal coverage with respect to a borehole), can include data that are known. The incomplete image may include missing data. For example, the incomplete image may include a subset of azimuthal data with respect to the complete image. The downhole acquisition data may include data, such as seismic data and resistivity data, gathered downhole in the wellbore. The sparse representation can include a matrix or other vector-type entity that can represent the image characteristics. In some examples, the sparse representation can include values that are mostly zero. An image generator can use the sparse representation to generate the complete image. For example, the image generator can perform one or more transformations on the sparse representation to generate the complete image. The transformations can include a one-dimensional discrete cosine transformation, a two-dimensional discrete cosine transformation, a two-dimensional discrete Fourier transform, or other suitable transformations. The image generator can use the transformations to generate an inverse sparse representation that can be used to generate the complete image. The complete image can be used with respect to one or more wellbore operations, for post-processing operations, and for other suitable operations with respect to the wellbore.

Other downhole tools for imaging in a wellbore may encounter hardware malfunctioning or other design limitations during operation. Accordingly, images produced by the other downhole tools may include only a limited spatial coverage during downhole acquisitions. The other downhole tools may use interpolation and extrapolation, which can have various minimum sampling density requirements and underlying continuity assumptions that may produce downhole images with apparent artifacts from data with large quantity and locally concentrated missing data such as data with wide acquisition gaps. An image generator can generate a complete image that includes 100% azimuthal coverage.

The image generator can use highly incomplete data and minimal continuity assumptions to aid in generating a complete image. The image generator can use one or more mathematical transformations of basis or frame, which can yield a sparse or compressible representation of the complete downhole data when an incomplete dataset can be acquired. Based on the dimension of available data, full data, and adopted transformation, an inverse problem can be solved to obtain a sparse representation. An inverse transform can be applied to an inverted sparse representation to generate the completed image of spatial coverage with respect to the wellbore. By using mathematical transformations to generate the complete image, the image generator can generate natural-appearing images even from a limited percentage of measurements. Additionally, the completed image can assist in controlling a treatment operation with respect to the wellbore and in the interpretation of geological, stratigraphic structure, and formation fluidic properties with respect to a subterranean formation.

The image generator can be applied to data acquired through various downhole acquisition and logging techniques using, for example, electrical, magnetic, electromagnetic, gravitational, acoustic, seismic, optical, and nuclear data acquisition techniques. The image generator can recover missing data for the complete image of different origins, which include azimuthal coverage constraints, malfunctioning of sensing or processing units during acquisition, discarded data values, and other suitable origins. The missing data can be spaced regularly or irregularly. The image generator can be applied to one or more incomplete images generated using downhole acquisition data, which can include one or more dimensions and can be geometrically oriented with respect to an acquisition tool body or array and the downhole environment.

The image generator can generate a complete borehole image by extracting one or more representative components from available data from a set of downhole acquisition data. A mathematical transformation can be used for capturing the representative components. The complete image, which can be denoted as array X, can be expressed with a sparse representation array s, by transformation with some mathematical basis or frame Ψ:

$$X = \Psi s \quad (1)$$

A numerical array, for example, s in equation 1, can be sparse when most elements of the numerical array are zero. The sparse representation can be determined using matrix operations or computations. Alternatively, the image generator can determine the sparse representation using matrix-free operations or computations. In an example in which a limited amount of measurements is available, an incomplete image Y can be related to the complete image X:

$$Y = \Phi X \quad (2)$$

where elements of operator Φ are each either zero or one depending on positions of available data. Φ is referred to as the restriction operator. Accordingly, the incomplete image can be associated with the sparse representation of the complete image:

$$Y = \Phi * \Psi = \Theta s \quad (3)$$

where Θ can be a composite operator of the restriction operator Φ and transformation basis or frame Ψ.

A sparse representation ŝ can be inverted by solving an optimization problem (that can be formulated into a constrained or a regularized problem):

$$\hat{s} = \mathrm{argmin}_s |s|_p \text{ subject to } |Y - \Theta s|_q \leq \sigma \quad (4)$$

where $|\cdot|_p$ represents the $\ell$ of an array in which p can be between 0 and 1 (both inclusive), and $|\cdot|_q$ represents some measurement of data misfit. For instance, the data misfit term can be represented by the $\ell_2$ norm, Huber norm, etc.

The techniques described herein can additionally address de-noising while recovering missing data from the incomplete image. A sensing operator, which can describe the linear algebraic relation between known image data points and incomplete or otherwise unknown image data points, can be created and can be incorporated into a composite array such as the sparse representation. De-noising can be achieved in conjunction with solving the optimization problem for the sparse representation.

The inverse problem can be used to determine a solution that fills in data gaps for optimizing sparsity in data representation by penalizing non-sparse representation caused by missing data. In the special case in which p=1 and q=2, equation 4, also known as the basis pursuit or the basis pursuit de-noise problem, can be a convex optimization problem. For examples in which p<1, equation 4 can be a non-convex optimization problem, which can be more robust against noise in the data at the expense of additional complexity to solve. The constraint in equation 4 can ensure the recovered full data to match the observed data Y at locations specified by the restriction operator Φ subject to some error tolerance σ specified by a user or otherwise predetermined. In an example in which σ=0, the image generator may attempt to generate a complete image that completely matches acquired data at locations where data are acquired.

A complete image X̂ can be recovered by applying the mathematical transformation Ψ to the inverted sparse representation:

$$\hat{X} = \Psi \hat{s} \quad (5)$$

The image generator can generate complete images using various mathematical transformations. For example, the mathematical transformations can include a one-dimensional discrete cosine transformation, a two-dimensional discrete cosine transformation, a two-dimensional discrete Fourier transform, a wavelet transform, a contourlet transform, a curvelet transform, or other suitable mathematical transformation. In other examples, the transformations can include multi-dimensional transformations and inverse transformations with respect to the transformations described herein.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
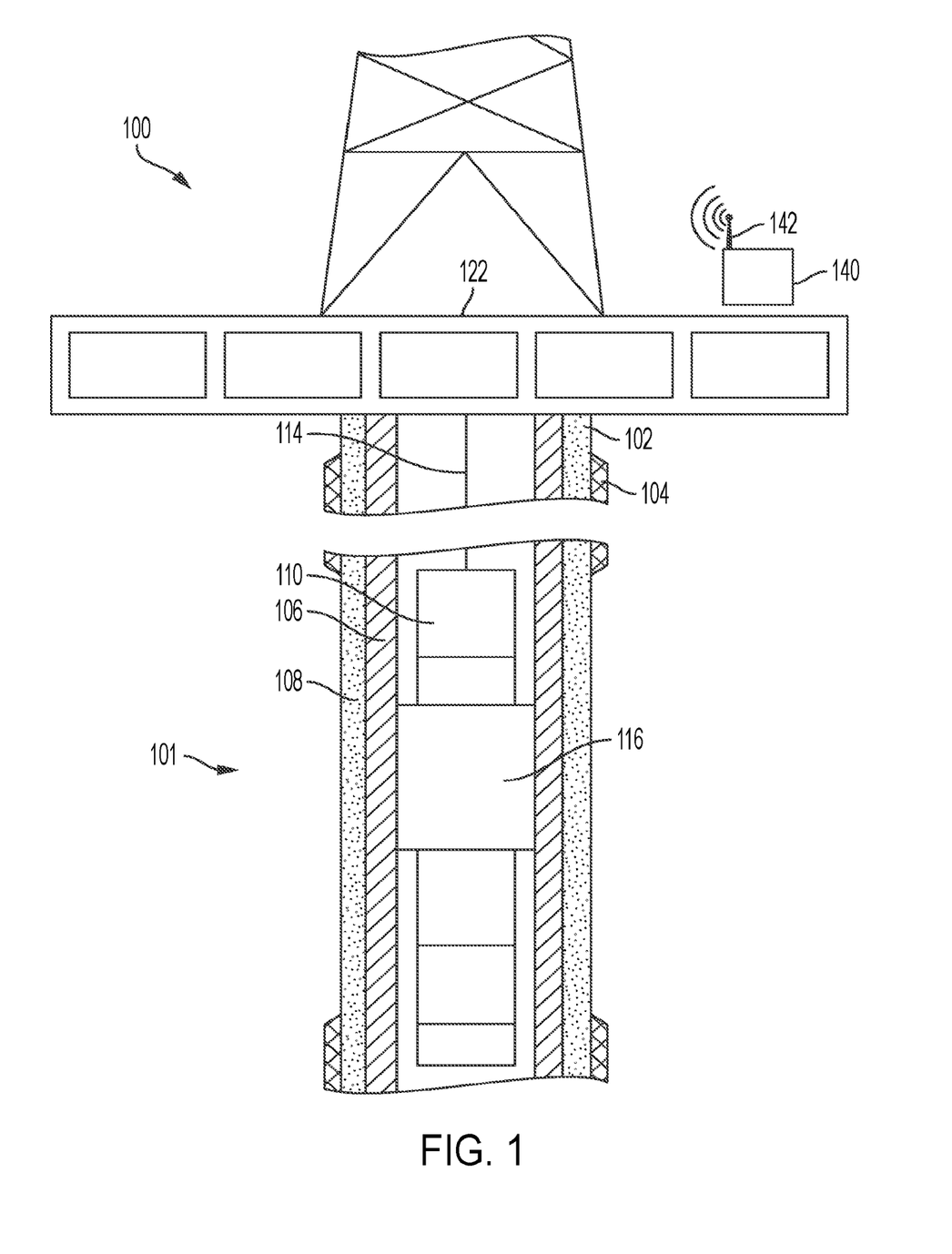
FIG. 1 is a schematic of a well system that includes an image generator for generating a complete image of a borehole according to one example of the present disclosure.

FIG. 1 a schematic of a well system 100 that includes an image generator 101 for generating a complete image of a borehole according to one example of the present disclosure. The well system 100 can include a wellbore 102 extending through various earth strata. The wellbore 102 can extend through a subterranean formation 104 that can include hydrocarbon material such as oil, gas, coal, or other suitable material. In some examples, a casing string 106 can extend from a well surface 122 into the subterranean formation 104. The casing string 106 can provide a conduit through which formation fluids, such as production fluids produced from the subterranean formation 104, can travel to the well surface 122. Additionally, the casing string 106 can allow the image generator 101 to be positioned in the wellbore 102 for imaging the wellbore 102. The casing string 106 can be coupled to walls of the wellbore 102 via cement or other suitable coupling material. For example, a cement sheath 108 can be positioned or formed between the casing string 106 and the walls of the wellbore 102 for coupling the casing string 106 to the wellbore 102. The casing string 106 can be coupled to the wellbore 102 using other suitable techniques.

The well system 100 can include at least one well tool 110 such as a well tool 110 that can include, can be included in, or can otherwise be associated with the image generator 101. The well tool 110 can be coupled to a wireline 114, a slickline, or a coiled tube that can be deployed into the wellbore 102. The wireline 114, the slickline, or the coiled tube can be guided into the wellbore 102 using, for example, a guide or winch. In some examples, the wireline 114, the slickline, or the coiled tube can be unwound from around a reel to be deployed into the wellbore 102.

The well tool 110 can include at least one resizable element 116. The resizable element 116 can longitudinally expand, contract, or a combination thereof. By longitudinally expanding, contracting, or a combination thereof, a total longitudinal length of the resizable element 116 can be adjusted. In some examples, the resizable element 116 can include two or more well tools (or well tool components) that are translatable with respect to one another for longitudinally expanding, contracting, or otherwise changing the total longitudinal length of the resizable element 116. For example, the resizable element 116 can include a well tool with a smaller diameter that is positioned coaxially within another well tool with a larger diameter. The well tools may be able to move (e.g., translate) with respect to one another to change the total longitudinal length of the resizable element 116.

In some examples, the resizable element 116 can be an imaging tool that can be included in the image generator 101. The resizable element 116 can expand to contact, or nearly contact, the walls of the wellbore 102 for generating an image of the wellbore 102. The image of the wellbore 102 may be incomplete. For example, by expanding to contact the walls of the wellbore 102, the resizable element 116 may experience a reduction in image resolution (e.g., from 65% azimuthal coverage to 57% azimuthal coverage). The incomplete image may be transmitted to a computing device 140 associated with the well system 100.

The computing device 140 can be positioned at the surface 122 of the well system 100. In some examples, the computing device 140 can be positioned downhole in the wellbore 102, remote from the well system 100, or in other suitable locations with respect to the well system 100. The computing device 140 can be communicatively coupled to the image generator 101, the well tool 110, the resizable element 116, other suitable components of the well system 100, or a combination thereof, via a wired or wireless connections. For example, as illustrated in FIG. 1, the computing device 140 can include an antenna 142 that can allow the computing device 140 to receive and to send communications relating to the well system 100. The computing device 140 can receive the downhole acquisition data and other suitable data from the image generator 101, the resizable element 116, other suitable components of the well system 100, or a combination thereof. The computing device 140 can use the received data to generate a complete image of the wellbore 102. In some examples, the computing device 140 can output the complete image for use in one or more wellbore operations or other suitable operations with respect to the well system 100.

Figure 2:
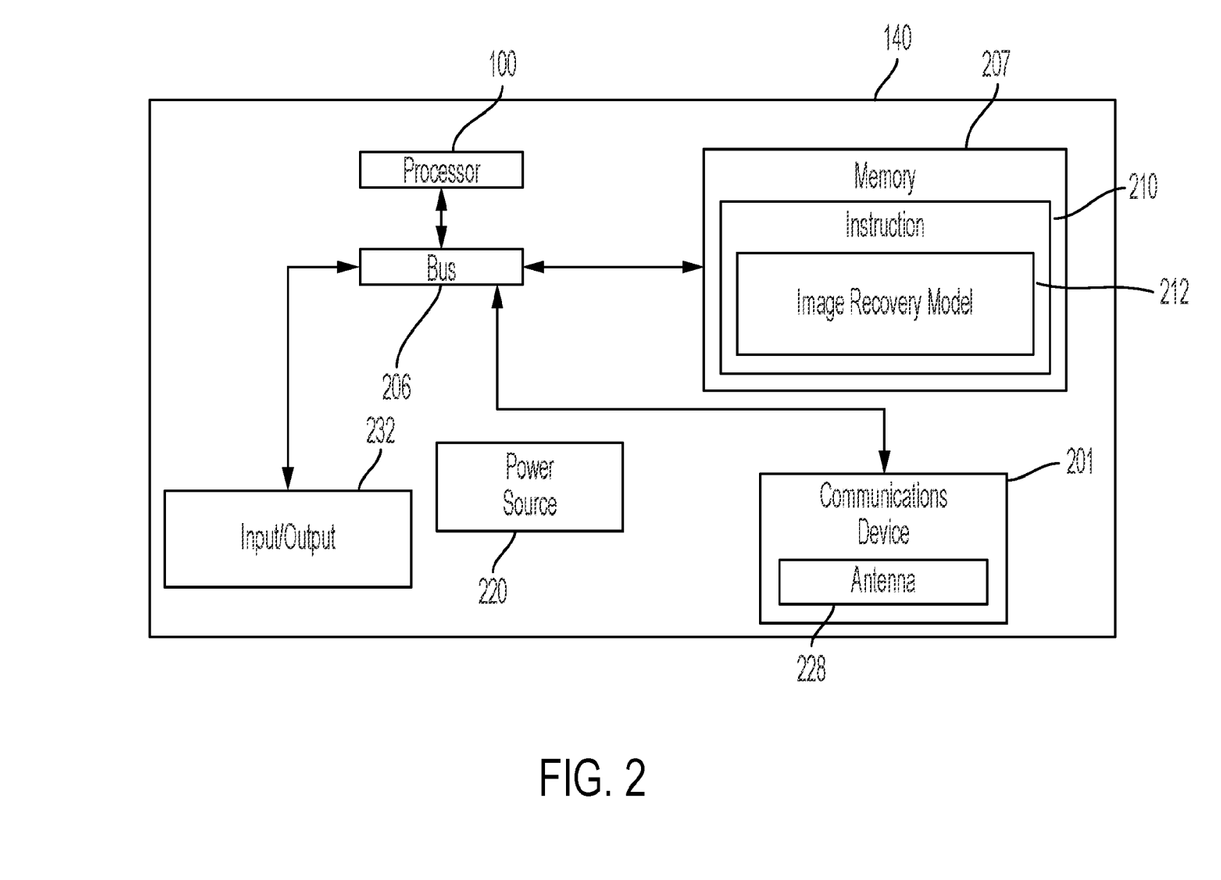
FIG. 2 is a block diagram of a computing system for generating a complete image of a borehole according to one example of the present disclosure.

FIG. 2 is a block diagram of a computing system 200 for generating a complete image of a borehole according to one example of the present disclosure. The components shown in FIG. 2, such as the processor 204, memory 207, power source 220, communications device 201, and the like, may be integrated into a single structure such as within a single housing of a computing device 140. Alternatively, the components shown in FIG. 2 can be distributed from one another and in electrical communication with each other.

The computing system 200 may include the computing device 140. The computing device 140 can include a processor 204, a memory 207, and a bus 206. The processor 204 can execute one or more operations for generating a complete borehole image with respect to the wellbore 102. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 may include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 207 can include computer program instructions 210 for generating the complete borehole image. For example, the computer program instructions 210 can include an image recovery model 212 that can be executed by the processor 204 for causing the processor 204 to perform various operations. For example, the image recovery model 212 can receive and pre-process downhole acquisition data related to the wellbore 102. The image recovery model 212 can additionally generate an incomplete borehole image, and a sparse representation of the incomplete borehole image, using the pre-processed downhole acquisition data. The image recovery model 212 can generate a complete borehole image using an inverse sparse representation of the incomplete borehole image.

The computing device 140 can include a power source 220. The power source 220 can be in electrical communication with the computing device 140 and the communications device 201. In some examples, the power source 220 can include a battery or an electrical cable (e.g., a wireline). The power source 220 can include an AC signal generator. The computing device 140 can operate the power source 220 to apply a transmission signal to the antenna 228 to generate electromagnetic waves that convey data relating to the wellbore 102, the image recovery model 212, etc., to other systems. For example, the computing device 140 can cause the power source 220 to apply a voltage with a frequency within a specific frequency range to the antenna 228. This can cause the antenna 228 to generate a wireless transmission. In other examples, the computing device 140, rather than the power source 220, can apply the transmission signal to the antenna 228 for generating the wireless transmission.

In some examples, a subset of the communications device 201 can be implemented in software. For example, the communications device 201 can include additional instructions stored in memory 207 for controlling functions of the communication device 201. The communications device 201 can receive signals from remote devices and transmit data to remote devices. For example, the communications device 201 can transmit wireless communications that are modulated by data via the antenna 228. In some examples, the communications device 201 can receive signals (e.g. associated with data to be transmitted) from the processor 204 and amplify, filter, modulate, frequency shift, or otherwise manipulate the signals. In some examples, the communications device 201 can transmit the manipulated signals to the antenna 228. The antenna 228 can receive the manipulated signals and responsively generate wireless communications that carry the data.

The computing device 140 can additionally include an input/output interface 232. The input/output interface 232 can include or otherwise connect to a keyboard, pointing device, display, and other computer input/output devices. An operator may provide input using the input/output interface 232. Data, such as downhole acquisition data, incomplete borehole images, complete borehole images, etc., relating to the wellbore 102 can be displayed to an operator or other suitable individual via a display that is connected to or is part of the input/output interface 232. The displayed values can be displayed to the operator, or to a supervisor, of one or more wellbore operations associated with the wellbore 102.

Figure 3:
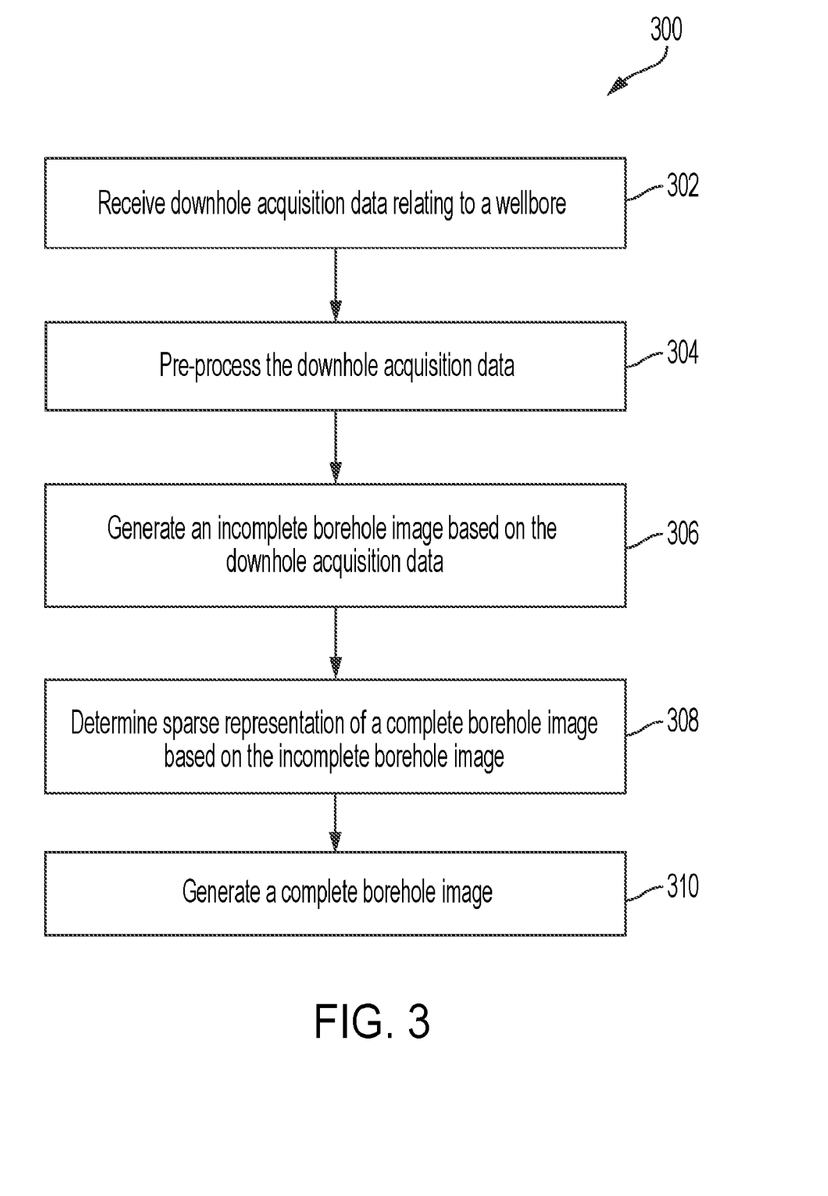
FIG. 3 is a flow chart of a process to generate a complete image of a borehole according to one example of the present disclosure.

FIG. 3 is a flow chart of a process 300 to generate a complete image of a borehole according to one example of the present disclosure. At block 302, the computing device 140 receives downhole acquisition data relating to a wellbore 102. The downhole acquisition data can include data about the subterranean formation 104 such as seismic data or resistivity data. In some examples, the downhole acquisition data can include data usable to generate one or more images of the wellbore 102, of the subterranean formation 104 surrounding the wellbore 102, or a combination thereof. The downhole acquisition data can be detected or otherwise gathered by a well tool, such as the image generator 101 or any subcomponent thereof (e.g., the resizable element 116), and the well tool can transmit the downhole acquisition data to the computing device 140.

At block 304, the computing device 140 pre-processes the downhole acquisition data. The computing device 140 can pre-process the downhole acquisition data using various techniques such as amplitude balancing. Other suitable pre-processing techniques can be used by the computing device 140 for pre-processing the downhole acquisition data. Depending on the environmental data acquisition geometry, other pre-processing techniques may include padding of additional acquired data over one more boundaries to improve data recovery reliability. Additionally, the computing device 140 can replicate or pad azimuthal data or data strips for representing a 2D-image (e.g., an incomplete borehole image) that can resemble the wellbore 102 or for implicating a geometry of the wellbore 102.

At block 306, the computing device 140 generates an incomplete borehole image of a borehole based on the downhole acquisition data. The borehole may be the wellbore 102 or may otherwise be associated with the well system 100. The incomplete borehole image can be generated using the pre-processed downhole acquisition data. The incomplete borehole image can include known data and unknown data. The computing device 140 can sort or otherwise filter the known data and the unknown data into known data strips and unknown data strips, respectively.

The computing device 140 can generate a plot of depth versus azimuth. The depth can be a measure of depth, or other suitable length measurement, in the borehole. The azimuth can be an angle measure (e.g., 0°-360° or other suitable degree measures) with respect to the borehole. The computing device 140 can populate the plot using the downhole acquisition data for generating the incomplete borehole image. In some examples, the plot can be, or can otherwise include, the incomplete borehole image. The plot can include the known data strips and the unknown data strips. The unknown data strips can be positioned interspersed with respect to the known data strips. For example, each unknown data strip can be adjacent to one or more known data strips. Additionally, a first data strip and a final data strip of the plot can be identical and may include known data with respect to an identical range of azimuth values.

At block 308, the computing device 140 determines a sparse representation of a complete borehole image based on the incomplete borehole image. In some examples, the computing device 140 can determine a relationship between the incomplete borehole image and the sparse representation of the complete borehole image. The incomplete borehole image can include, or may be represented by, one or more matrices or other type of vector value. The computing device 140 can use the vector representation of the incomplete borehole image to determine a sparse representation of a borehole image such as a complete borehole image. For example, as described with respect to equation 1, the sparse representation can be related to the incomplete borehole via a basis or frame. The sparse representation can include a matrix or other suitable vector value that may include values mostly equal to zero. The computing device 140 may determine the transformation, which can include a one-dimensional discrete cosine transformation, a two-dimensional discrete cosine transformation, a two-dimensional discrete Fourier transformation or other suitable transformation.

In some examples, the computing device 140 can determine an inverse sparse representation of the complete borehole image based on the incomplete borehole image by using the sparse representation determined at the block 308. The inverse sparse representation can include a matrix or other suitable vector value that can be related to a complete borehole image via the basis or frame as described in equation 5. The inverse sparse representation can be inverted from the sparse representation, determined at the block 308, by applying the inverse transformation to the sparse representation. In some examples, the sparse representation can be determined by solving or otherwise applying an optimization problem with respect to the sparse representation. For example, the optimization problem can involve minimizing arguments of the sparse representation subject to a constraint, which may include the incomplete borehole image, within an $L_p$ space. The optimization problem can additionally include a measure of data misfit q. In some examples, the optimization problem can include or relate to equation 4 as described above.

At block 310, the computing device 140 generates a complete borehole image. The complete borehole image can be based on, or otherwise related to, an inverse of the sparse representation determined at the block 308. In some examples, the computing device 140 can generate the complete borehole image, using or otherwise based on, the inverse sparse representation described above. The complete borehole image may include known data for 100% of the azimuth with respect to the borehole (e.g., the complete borehole image may not include unknown data). The computing device 140 can output the complete borehole image for use in one or more wellbore operations. For example, the complete borehole image can be used to control a wellbore treatment operation or other suitable wellbore operation.

Figure 4:
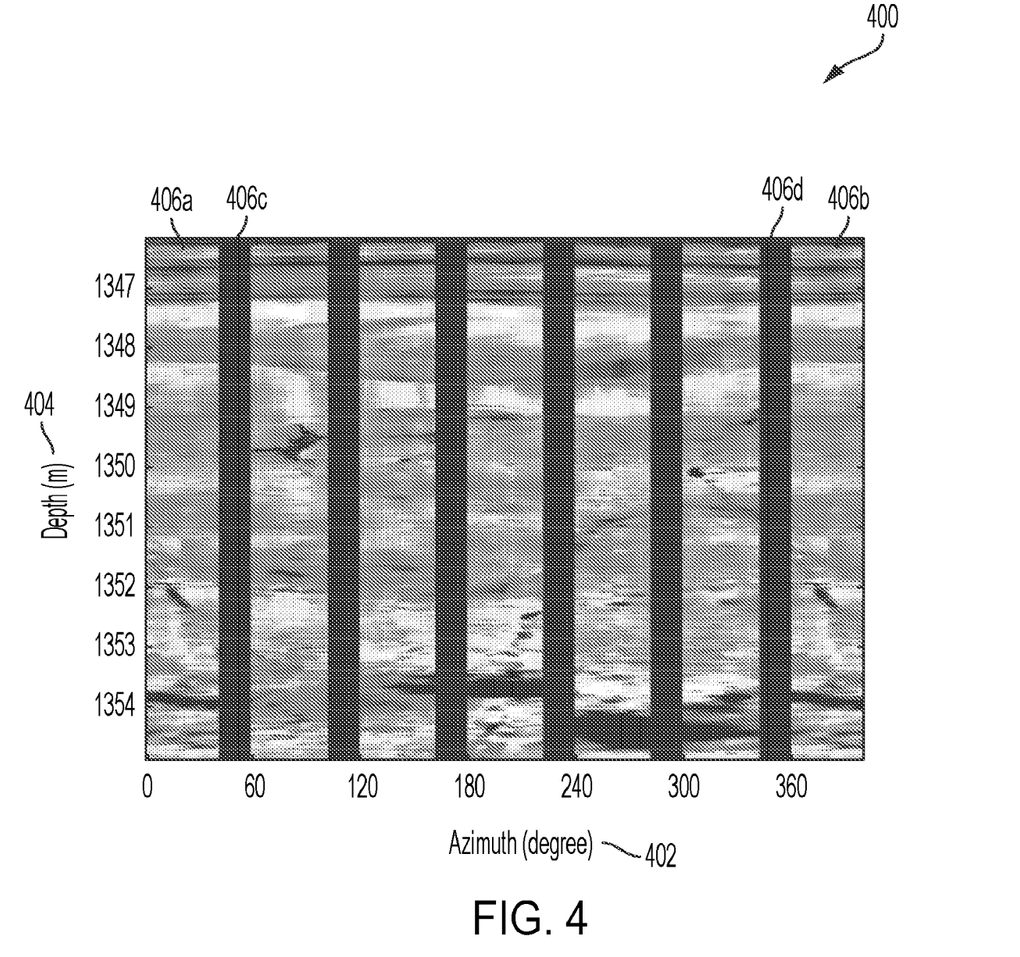
FIG. 4 is an example of a plot of an incomplete image of a borehole according to one example of the present disclosure.

FIG. 4 is an example of a plot 400 of an incomplete image of a borehole according to one example of the present disclosure. The plot 400 can include a horizontal axis 402 and a vertical axis 404. The horizontal axis 402 can be or can include measures of azimuth with respect to the borehole (e.g., walls of the wellbore 102). The vertical axis 404 can be or include measures of depth, in meters or other suitable distance units, with respect to the wellbore 102.

The plot 400 can additionally include a set of strips. The strips can include data that can include known data, unknown data, and other suitable data included in the downhole acquisition data. For example, the strips can include known data strips and unknown data strips. In some examples, strips 406a-b can be a known data strips and strip 406c can be an unknown data strip. The strip 406c may be black since no data may be known with respect to the depth and azimuth combinations with respect to the wellbore 102 occupied by the strip 406c. The strips 406a-b may be populated by the computing device 140 using downhole acquisition data, for example, described with respect to the block 302 of the process 300. The strips 406a-b are identical, as a result of the preprocessing step, shown in the block 304 of the process 300. For example, the data included in the strips 406a-b include the same data about the same depth and azimuth combinations with respect to the wellbore 102. The computing device 140 may populate the strips 406a-b with identical known data for allowing adjacent unknown data strips, such as the strip 406*d*, to be determined for generating the complete borehole image.

Figure 5:
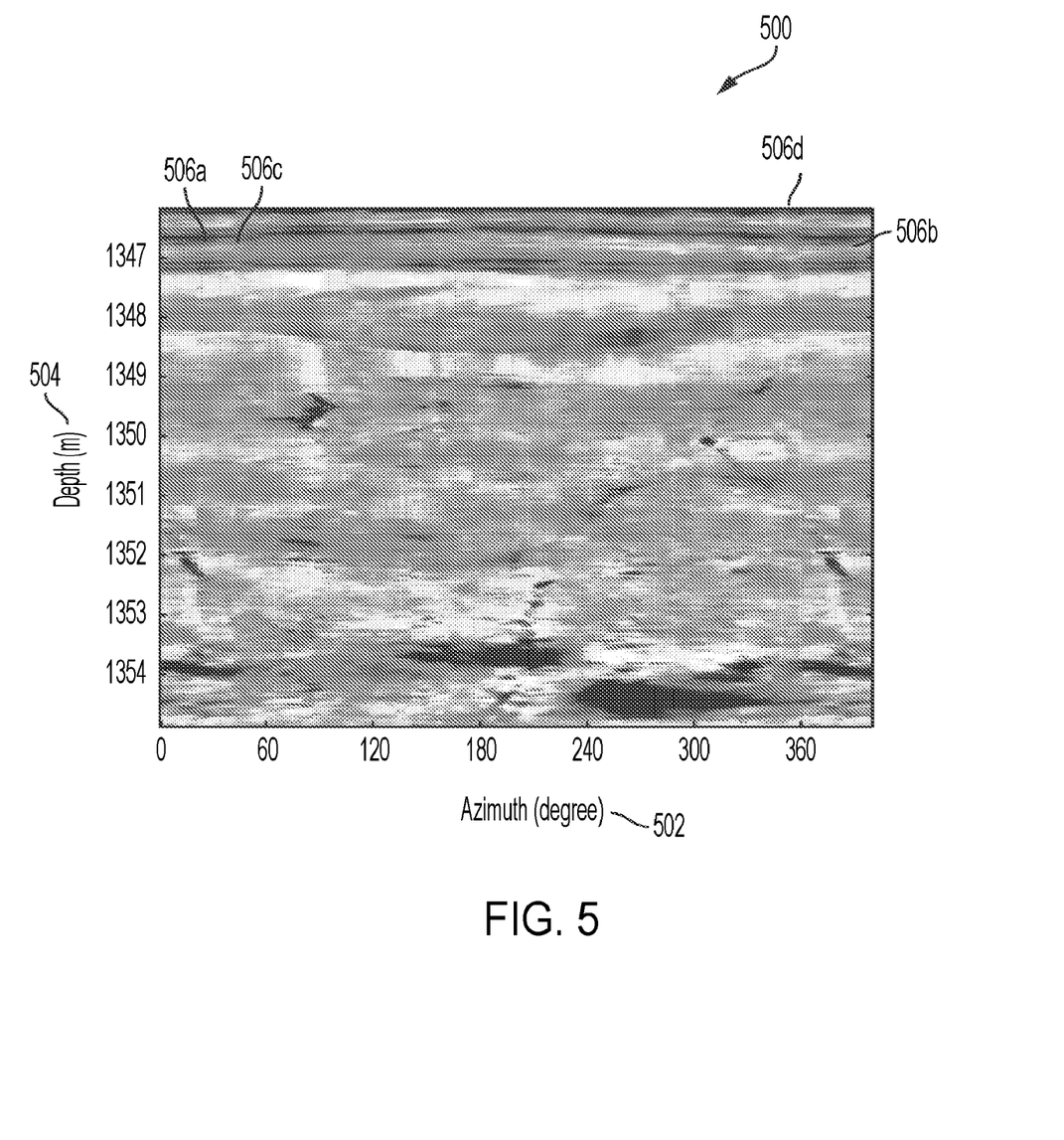
FIG. 5 is an example of a plot of a complete image of a borehole according to one example of the present disclosure.

FIG. 5 is an example of a plot 500 of a complete image of a borehole according to one example of the present disclosure. The plot 500 can include a horizontal axis 502 and a vertical axis 504. The horizontal axis 502 can be or can include measures of azimuth with respect to the borehole (e.g., walls of the wellbore 102). The vertical axis 504 can be or include measures of depth, in meters or other suitable distance units, with respect to the wellbore 102. In some examples, the horizontal axis 502 is identical to the horizontal axis 402, and the vertical axis 504 is identical to the vertical axis 404. The computing device 140 may perform a two-dimensional Fourier transform with respect to data of the plot 400 to generate the plot 500.

The plot 500 can additionally include a set of strips. In contrast to the plot 400, the plot 500 can include known data strips and may not include unknown data strips. The strips 506*a-d* may correspond to similar or identical depth and azimuth combinations with respect to the strips 406*a-c*. For example, the strip 506*a* may be similar or identical to the strip 406*a* and the strip 506*b* may be similar or identical to the strip 406*b*. The strips 506*c-d* may include known data, whereas the strips 406*c-d*, while corresponding to the respective physical locations represented by the strips 506*c-d*, may not include known data. The computing device 140 may perform the two-dimensional Fourier transform on data of the plot 400 to generate known data to populate in the strip 506*c*. By performing the transform, the computing device 140 may be able to generate a complete borehole image that does not include missing data and, instead, includes 100% azimuthal coverage data.

In some aspects, systems, methods, and non-transitory computer-readable mediums for generating a complete image of a borehole using a transformation are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving downhole acquisition data relating to a wellbore; pre-processing the downhole acquisition data; generating an incomplete borehole image using the downhole acquisition data; determining a sparse representation based on the incomplete borehole image by performing an optimization with respect to the incomplete borehole image; and generating a complete borehole image based on an inverse of the sparse representation.

Example 2 is the system of example 1, wherein the operations further comprise using the complete borehole image for controlling a treatment operation with respect to the wellbore.

Example 3 is the system of example 1, wherein the operation of pre-processing the downhole acquisition data includes balancing an amplitude of the downhole acquisition data, and replicating azimuthal data strips for representing a 2D-image that resembles the wellbore.

Example 4 is the system of example 1, wherein the operation of generating the incomplete borehole image using the downhole acquisition data includes generating a plot of depth versus azimuth, wherein the plot includes a plurality of strips, wherein the plurality of strips includes a set of unknown data strips that are interspersed between a set of known data strips, and wherein a first known data strip is identical to a last known data strip.

Example 5 is the system of example 1, wherein the operation of determining a sparse representation based on the incomplete borehole image by performing an optimization with respect to the incomplete borehole image includes determining a transformation, and wherein the transformation includes one of a one-dimensional discrete cosine transformation, a two-dimensional discrete cosine transformation, and a two-dimensional discrete Fourier transformation.

Example 6 is the system of example 1, wherein the operation of generating the complete borehole image includes applying an inverse transformation to the sparse representation based on the incomplete borehole image to generate the complete borehole image.

Example 7 is the system of example 1, wherein the operation of determining the sparse representation based on the incomplete borehole image by performing the optimization with respect to the incomplete borehole image includes minimizing the sparse representation of the incomplete borehole image in an $L_p$ space subject to one or more constraints.

Example 8 is a method comprising: receiving downhole acquisition data relating to a wellbore; pre-processing the downhole acquisition data; generating an incomplete borehole image using the downhole acquisition data; determining a sparse representation based on the incomplete borehole image by performing an optimization with respect to the incomplete borehole image; and generating a complete borehole image based on an inverse of the sparse representation.

Example 9 is the method of example 8, further comprising using the complete borehole image for controlling a treatment operation with respect to the wellbore.

Example 10 is the method of example 8, wherein pre-processing the downhole acquisition data includes balancing an amplitude of the downhole acquisition data, and padding of azimuthal data to implicate geometry of the wellbore.

Example 11 is the method of example 8, wherein generating the incomplete borehole image using the downhole acquisition data includes generating a plot of depth versus azimuth, wherein the plot includes a plurality of strips, wherein the plurality of strips includes a set of unknown data strips that are interspersed between a set of known data strips, and wherein a first known data strip is identical to a last known data strip.

Example 12 is the method of example 8, wherein determining a sparse representation based on the incomplete borehole image by performing an optimization with respect to the incomplete borehole image includes determining a transformation, and wherein the transformation includes one of a one-dimensional discrete cosine transformation, a two-dimensional discrete cosine transformation, and a two-dimensional discrete Fourier transformation.

Example 13 is the method of example 8, wherein generating the complete borehole image includes applying an inverse transformation to the sparse representation of the incomplete borehole image to generate the complete borehole image.

Example 14 is the method of example 8, wherein determining the sparse representation based on the incomplete borehole image by performing the optimization with respect to the incomplete borehole image includes minimizing the sparse representation of the incomplete borehole image in an $L_p$ space subject to one or more constraints.

Example 15 is a non-transitory computer-readable medium comprising instructions that are executable by a processing device for causing the processing device to perform operations comprising: receiving downhole acquisition data relating to a wellbore; pre-processing the downhole acquisition data; generating an incomplete borehole image using the downhole acquisition data; determining a sparse representation based on the incomplete borehole image by performing an optimization with respect to the incomplete borehole image; and generating a complete borehole image based on an inverse of the sparse representation.

Example 16 is the non-transitory computer-readable medium of example 15, wherein the operations further comprise using the complete borehole image for controlling a treatment operation with respect to the wellbore.

Example 17 is the non-transitory computer-readable medium of example 15, wherein the operation of pre-processing the downhole acquisition data includes balancing an amplitude of the downhole acquisition data, and padding of azimuthal data to implicate geometry of the wellbore.

Example 18 is the non-transitory computer-readable medium of example 15, wherein the operation of generating the incomplete borehole image using the downhole acquisition data includes generating a plot of depth versus azimuth, wherein the plot includes a plurality of strips, wherein the plurality of strips includes a set of unknown data strips that are interspersed between a set of known data strips, and wherein a first known data strip is identical to a last known data strip.

Example 19 is the non-transitory computer-readable medium of example 15, wherein the operation of determining a sparse representation based on the incomplete borehole image by performing an optimization with respect to the incomplete borehole image includes determining a transformation, and wherein the transformation includes one of a one-dimensional discrete cosine transformation, a two-dimensional discrete cosine transformation, and a two-dimensional discrete Fourier transformation.

Example 20 is the non-transitory computer-readable medium of example 15, wherein the operation of generating the complete borehole image includes applying an inverse transformation to the sparse representation of the incomplete borehole image to generate the complete borehole image, and wherein the operation of determining the sparse representation based on the incomplete borehole image by performing the optimization with respect to the incomplete borehole image includes minimizing the sparse representation of the incomplete borehole image in an $L_p$ space subject to one or more constraints.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a non-transitory computer-readable medium comprising instructions that are executable by the processor to cause the processor to perform operations comprising:
pre-processing downhole acquisition data relating to a wellbore by balancing an amplitude of the downhole acquisition data and by replicating azimuthal data strips to represent a 2D-image that resembles the wellbore;
generating an incomplete borehole image using the downhole acquisition data by generating a plot having a plurality of strips, wherein at least a first portion of one or more first known data strips corresponds to at least a second portion of one or more second known data strips, wherein the one or more first known data strips are opposite the one or more second known data strips with respect to the plot;
determining a sparse representation based on the incomplete borehole image by performing an optimization with respect to the incomplete borehole image; and
generating a complete borehole image based on an inverse of the sparse representation.

2. The system of claim 1, wherein the operations further comprise using the complete borehole image to control a treatment operation with respect to the wellbore.

3. The system of claim 1, wherein the operation of generating the incomplete borehole image using the downhole acquisition data includes generating the plot that is a plot of depth versus azimuth, and wherein the plurality of strips includes a set of unknown data strips that are interspersed between a set of known data strips.

4. The system of claim 1, wherein the operation of determining a sparse representation based on the incomplete borehole image by performing an optimization with respect to the incomplete borehole image includes determining the sparse representation via a transformation.

5. The system of claim 4, wherein the transformation includes one of a one-dimensional discrete cosine transformation, a two-dimensional discrete cosine transformation, and a two-dimensional discrete Fourier transformation.

6. The system of claim 1, wherein the operation of generating the complete borehole image includes applying an inverse transformation to the sparse representation based on the incomplete borehole image to generate the complete borehole image.

7. The system of claim 1, wherein the operation of determining the sparse representation based on the incomplete borehole image by performing the optimization with respect to the incomplete borehole image includes minimizing the sparse representation of the incomplete borehole image in an $L_p$ space subject to one or more constraints.

8. A method comprising:
pre-processing downhole acquisition data relating to a wellbore by balancing an amplitude of the downhole acquisition data and by replicating azimuthal data strips to represent a 2D-image that resembles the wellbore;
generating an incomplete borehole image using the downhole acquisition data by generating a plot having a plurality of strips, wherein at least a first portion of one or more first known data strips corresponds to at least a second portion of one or more second known data strips, wherein the one or more first known data strips are opposite the one or more second known data strips with respect to the plot;

determining a sparse representation based on the incomplete borehole image by performing an optimization with respect to the incomplete borehole image; and generating a complete borehole image based on an inverse of the sparse representation.

9. The method of claim 8, further comprising using the complete borehole image to control a treatment operation with respect to the wellbore.

10. The method of claim 8, wherein generating the incomplete borehole image using the downhole acquisition data includes generating the plot that is a plot of depth versus azimuth, and wherein the plurality of strips includes a set of unknown data strips that are interspersed between a set of known data strips.

11. The method of claim 8, wherein determining a sparse representation based on the incomplete borehole image by performing an optimization with respect to the incomplete borehole image includes determining the sparse representation via a transformation.

12. The method of claim 11, wherein the transformation includes one of a one-dimensional discrete cosine transformation, a two-dimensional discrete cosine transformation, and a two-dimensional discrete Fourier transformation.

13. The method of claim 8, wherein generating the complete borehole image includes applying an inverse transformation to the sparse representation based on the incomplete borehole image to generate the complete borehole image.

14. The method of claim 8, wherein determining the sparse representation based on the incomplete borehole image by performing the optimization with respect to the incomplete borehole image includes minimizing the sparse representation of the incomplete borehole image in an $L_p$ space subject to one or more constraints.

15. A non-transitory computer-readable medium comprising instructions that are executable by a processing device for causing the processing device to perform operations comprising:

pre-processing downhole acquisition data relating to a wellbore by balancing an amplitude of the downhole acquisition data and by replicating azimuthal data strips to represent a 2D-image that resembles the wellbore;

generating an incomplete borehole image using the downhole acquisition data by generating a plot having a plurality of strips, wherein at least a first portion of one or more first known data strips corresponds to at least a second portion of one or more second known data strips, wherein the one or more first known data strips are opposite the one or more second known data strips with respect to the plot;

determining a sparse representation based on the incomplete borehole image by performing an optimization with respect to the incomplete borehole image; and generating a complete borehole image based on an inverse of the sparse representation.

16. The non-transitory computer-readable medium of claim 15, wherein the operations further comprise using the complete borehole image to control a treatment operation with respect to the wellbore.

17. The non-transitory computer-readable medium of claim 15, wherein the operation of generating the incomplete borehole image using the downhole acquisition data includes generating the plot that is a plot of depth versus azimuth, and wherein the plurality of strips includes a set of unknown data strips that are interspersed between a set of known data strips.

18. The non-transitory computer-readable medium of claim 15, wherein the operation of determining a sparse representation based on the incomplete borehole image by performing an optimization with respect to the incomplete borehole image includes determining the sparse representation via a transformation, and wherein the transformation includes one of a one-dimensional discrete cosine transformation, a two-dimensional discrete cosine transformation, and a two-dimensional discrete Fourier transformation.

19. The non-transitory computer-readable medium of claim 15, wherein the operation of generating the complete borehole image includes applying an inverse transformation to the sparse representation based on the incomplete borehole image to generate the complete borehole image.

20. The non-transitory computer-readable medium of claim 15, wherein the operation of determining the sparse representation based on the incomplete borehole image by performing the optimization with respect to the incomplete borehole image includes minimizing the sparse representation of the incomplete borehole image in an $L_p$ space subject to one or more constraints.

* * * * *